US012614546B2

(12) United States Patent
Arvind et al.

(10) Patent No.: US 12,614,546 B2
(45) Date of Patent: Apr. 28, 2026

(54) AUTOMATIC PERSONAL IDENTIFIABLE INFORMATION REMOVAL FROM AUDIO

(71) Applicant: Intel Corporation, Santa Clara, CA (US)

(72) Inventors: Raju Arvind, Camas, WA (US); Jose Lopez, Cambridge, MA (US); Georg Stemmer, Munich (DE)

(73) Assignee: Intel Corporation, Santa Clara, CA (US)

( * ) Notice: Subject to any disclaimer, the term of this patent is extended or adjusted under 35 U.S.C. 154(b) by 1010 days.

(21) Appl. No.: 17/456,270

(22) Filed: Nov. 23, 2021

(65) Prior Publication Data

US 2022/0084521 A1      Mar. 17, 2022

(51) Int. Cl.
*G10L 15/22* (2006.01)

(52) U.S. Cl.
CPC ................................... *G10L 15/22* (2013.01)

(58) Field of Classification Search
CPC ......... G10L 15/22; G10L 15/00; G10L 21/00; G10L 25/84; G06F 21/6245
See application file for complete search history.

(56) References Cited

U.S. PATENT DOCUMENTS

| | | | | |
|---|---|---|---|---|
| 9,087,520 | B1 * | 7/2015 | Salvador | G10L 25/84 |
| 2008/0221882 | A1 * | 9/2008 | Bundock | G10L 15/26 |
| | | | | 704/235 |

| | | | | |
|---|---|---|---|---|
| 2009/0319267 | A1 * | 12/2009 | Kurki-Suonio | G10L 15/30 |
| | | | | 704/235 |
| 2010/0312555 | A1 * | 12/2010 | Plumpe | G10L 15/14 |
| | | | | 704/270.1 |
| 2017/0142512 | A1 * | 5/2017 | Klimanis | H04R 1/1083 |
| 2020/0110900 | A1 * | 4/2020 | Abdi Taghi Abad | G06F 21/31 |
| 2020/0128143 | A1 * | 4/2020 | Nishioka | G10L 15/25 |
| 2020/0211539 | A1 * | 7/2020 | Lee | G10L 15/20 |
| 2020/0273465 | A1 * | 8/2020 | Hamamura | G10L 13/00 |
| 2020/0389718 | A1 * | 12/2020 | Klimanis | G10L 25/84 |
| 2020/0410980 | A1 * | 12/2020 | Yamada | G06F 3/167 |
| 2021/0183227 | A1 * | 6/2021 | Kovscek | G08B 21/18 |
| 2021/0287661 | A1 * | 9/2021 | Sharma | G10L 21/02 |
| 2021/0389924 | A1 * | 12/2021 | Chong | H04W 12/02 |
| 2022/0148588 | A1 * | 5/2022 | Yae | G10L 15/00 |
| 2022/0351744 | A1 * | 11/2022 | Krishnan | G06N 3/045 |
| 2022/0358950 | A1 * | 11/2022 | Javeri | H04R 3/04 |

* cited by examiner

*Primary Examiner* — Mark Villena

(74) *Attorney, Agent, or Firm* — Akona IP PC

(57) ABSTRACT

This disclosure describes systems, methods, and devices related to automatic personal identifiable information (PII) removal. A system may detect a sound signal received from a vicinity of a machine during the operation of the machine. The system may perform speech detection to detect a segment of the sound signal that comprises a speech signal. The system may modify the sound signal at the segment of the sound signal by performing a segment replacement mechanism. The system may generate a filtered sound signal to be used for monitoring the operation of the machine.

20 Claims, 7 Drawing Sheets

AUTOMATIC PERSONAL IDENTIFIABLE INFORMATION REMOVAL FROM AUDIO

TECHNICAL FIELD

This disclosure generally relates to systems and methods for speech recognition and, more particularly, to automatic personal identifiable information (PII) removal from audio.

BACKGROUND

Data collection is an important part of modern, deep learning-based, machine learning pipelines. The data collection work needs to be automated to handle large amounts of data efficiently. In recent times, privacy concerns in machine learning datasets have become a concern, and, companies have prioritized privacy at the data collection stage of machine learning pipelines.

Figure 1:
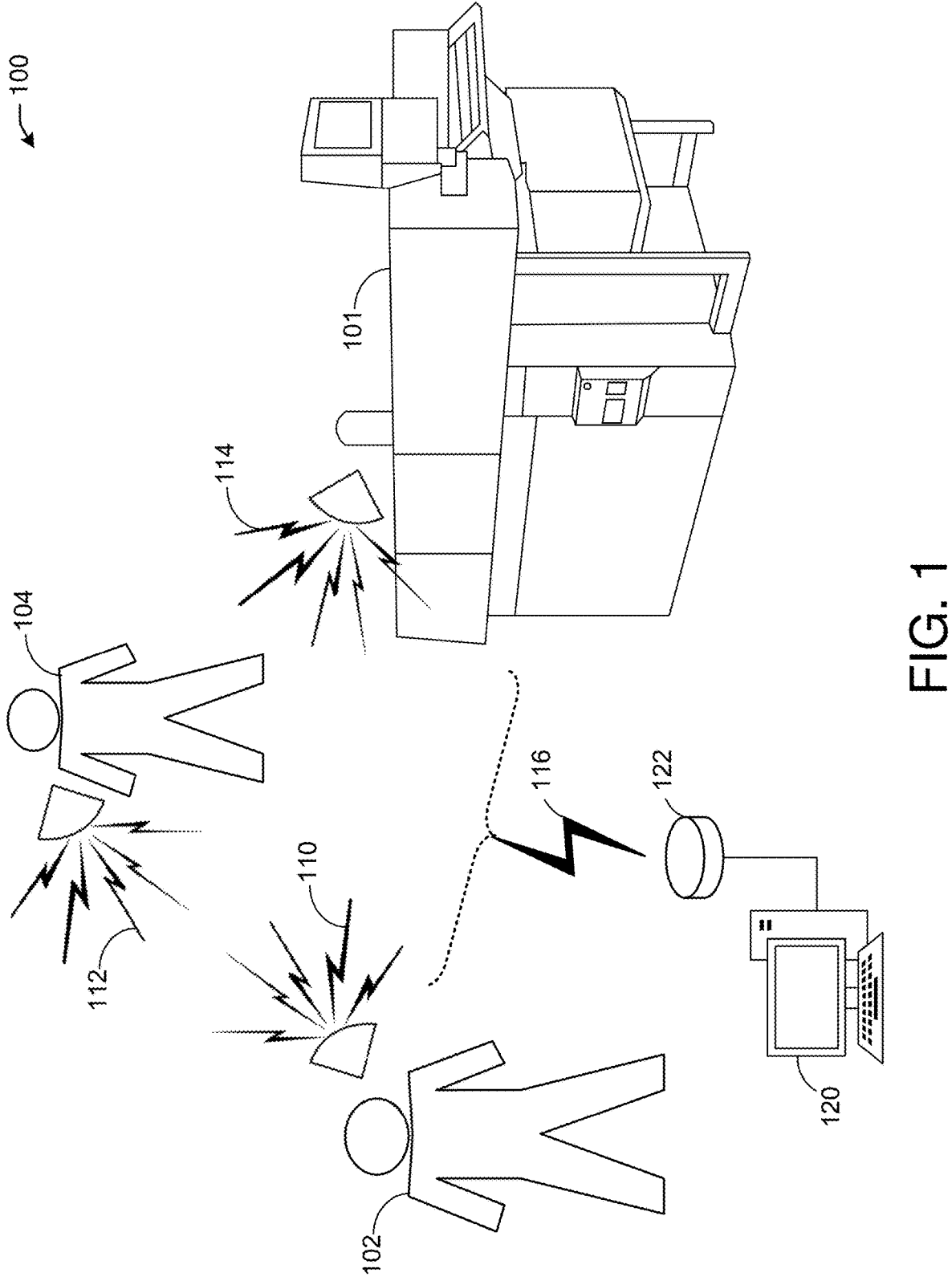
FIG. 1 illustrates an example environment of an automatic personal identifiable information (PII) removal system, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

The following description and the drawings sufficiently illustrate specific embodiments to enable those skilled in the art to practice them. Other embodiments may incorporate structural, logical, electrical, process, algorithm, and other changes. Portions and features of some embodiments may be included in or substituted for, those of other embodiments. Embodiments set forth in the claims encompass all available equivalents of those claims.

Companies require ingested data to have personal identifiable information (PII) that is information that can be used to identify an individual, removed from the data to protect the privacy of the individual. For example, when a car maps streets using its cameras, the faces of people in the video are purposefully made blurry in post-processing prior to publishing the map.

This type of post-processing is important for other sensor modalities, too. In recent times, efforts to improve the efficiency and reliability of modern manufacturing plants using audio have increased. However, efforts to remove PII from industrial audio datasets have lagged. Industrial production sites are places where humans and machines intermingle, so it is important to address privacy concerns there as well. Practitioners have traditionally relied on manual editing of data to remove PII, if they removed it at all.

Manually removing PII from audio data, even using services is costly and time consuming. Furthermore, it is simply infeasible to use manual filtering for dynamic datasets which continuously ingest data.

Example embodiments of the present disclosure relate to systems, methods, and devices for automatic personal identifiable information (PII) removal from audio samples from devices such as industrial machines or other types of devices.

In one or more embodiments, an automatic PII removal system may use modern automatic speech recognition (ASR) techniques to automatically detect human speech and sounds in an environment that may intermingle human sounds with machine sounds. By removing the requirement to transcribe the audio, real-time efficiency can be obtained because the ASR engine only needs to identify human sounds. Once identified, the audio samples are replaced, for example by a constant value, or by the output of a speech-removal algorithm. The two modes of replacement give the end user some flexibility in the PII removal process. For example, if it is known that the machines being monitored produce sounds that do not overlap with human speech, simply replacing the speech with a constant value is enough. However, if there are overlapping frequencies, attempting to remove the speech while preserving the background sounds may be more suitable.

In one or more embodiments, an automatic PII removal system may facilitate that the sample time indices and segment length of the replaced speech are also recorded in order to inform downstream algorithms of the segments that were modified during the PII removal process. For example, in case the downstream algorithms prefer to simply not process those segments. The advantage of this method is that enables automatic removal of PII from industrial data collection pipelines.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 depicts an illustrative schematic diagram for an automatic PII removal system, in accordance with one or more example embodiments of the present disclosure.

Numerous benefits may exist for knowing when a machine requires replacement or repair. This information is useful in order to provide operators with the opportunity to be able to address issues to prevent possible machine breakdown. A machine breaking down could result in a backlog of other work that depends on that machine. Currently, preventative and predictive maintenance may exist in order to help diagnose a machine before it breaks down. Usually, sensors (e.g., vibration sensors or other sensors) may be installed on a machine in order to sense, for example, machine vibrations. However, these sensors may be expensive and require to be connected to the machine.

Referring to FIG. 1, there is shown an example that includes an industrial machine 101 operating in an environment. The industrial machine 101 may generate sound 114 during operation. In addition to the industrial machine 101, users 102 and 104 may be communicating and generating speech 110 and speech 112. The various sounds (e.g., sound 114, speech 110, and speech 112) may overlap and interlace with each other.

It should be understood that although the machine shown in FIG. 1 is an industrial machine, this is not a limitation and other types of machines may also benefit from the automatic PII removal system.

In one or more embodiments, the automatic PII removal system may facilitate using sensors such as a microphone to detect sounds in a vicinity of a machine without the need to be attached to the machine. The microphone however may capture private conversations that may be present due to persons engaged in private conversations during the operation of the microphone. It is important to address such situations and one way may be to listen to the clip and manually crop it out. However, this is expensive and time-consuming and may occupy an experienced employee's time to do so.

In one or more embodiments, the automatic PII removal system may utilize a computer system 120 that comprises a sensor 122 (e.g., a microphone) that may be capable of detecting the various sounds. The sound 116 may be a combination of the various sounds when received by the sensor 122.

In one or more embodiments, the automatic PII removal system may capture sound 116 using the sensor 122. The computer system 120 may implement one or more algorithms in order to identify human speech and isolate it from the sound 114 of the industrial machine 101.

In one or more embodiments, the automatic PII removal system may facilitate utilizing artificial intelligence (AI) or machine learning to isolate portions of captured sounds (e.g., sound 114, speech 110, and speech 112) to determine whether human speech (e.g., speech 110 and speech 112) is present or overlaps the sound 114 coming from the industrial machine 101 itself.

In one or more embodiments, the automatic PII removal system may identify sounds/frequencies associated with a human speech and a background frequency associated with the machine. In that sense, the automatic PII removal system may apply a filter to remove frequencies associated with human speech. The automatic PII removal system may also remove frequencies that are not expected from the background frequencies. This may be achieved by comparing frequencies of captured segments of sound and the expected/reference background frequencies.

In one or more embodiments, the automatic PII removal system may facilitate that in case the machine sounds happen to reside in the same frequency spectrum that is typically human speech centric, the automatic PII removal system may determine to remove those segments that are identified to have an overlapping frequency spectrum.

In one or more embodiments, the automatic PII removal system may facilitate training using a machine learning model with data that may be captured during the operation of the machine without the influence of human sound in the vicinity of the machine. This way, the automatic PII removal system may be able to determine a background reference sound that may be used during real-time operation.

In one or more embodiments, the automatic PII removal system may utilize the training that was performed without speech to infer a human speech that may be interlaced with the machine sound. The automatic PII removal system may attempt to remove the segments that may have interlaced human speech and machine sound or may attempt to remove the human speech while keeping the background sound.

It is understood that the above descriptions are for purposes of illustration and are not meant to be limiting.

Figure 2:
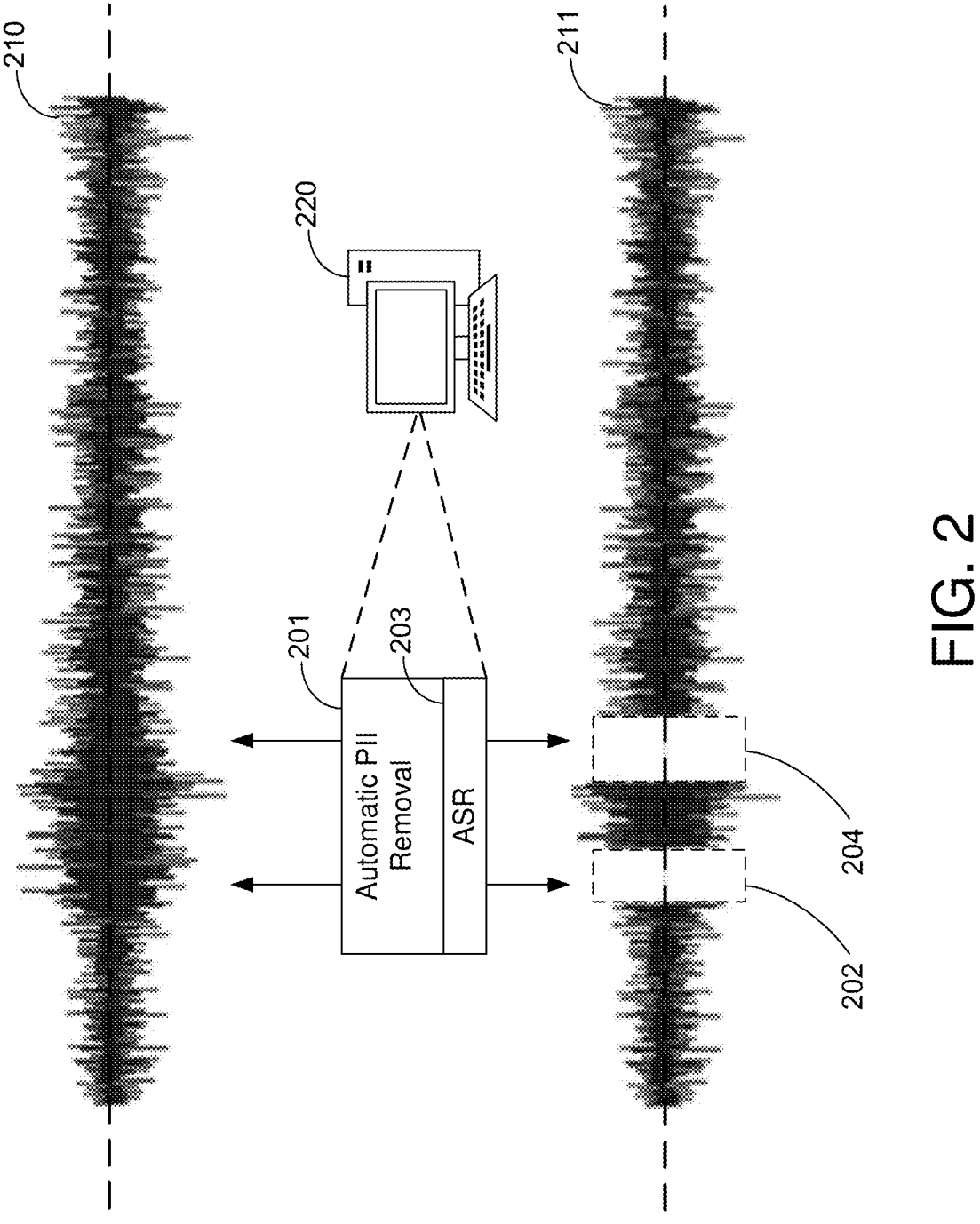
FIGS. 2 and 3 depict illustrative schematic diagrams for an automatic PII removal algorithm system, in accordance with one or more example embodiments of the present disclosure.
Figure 3:
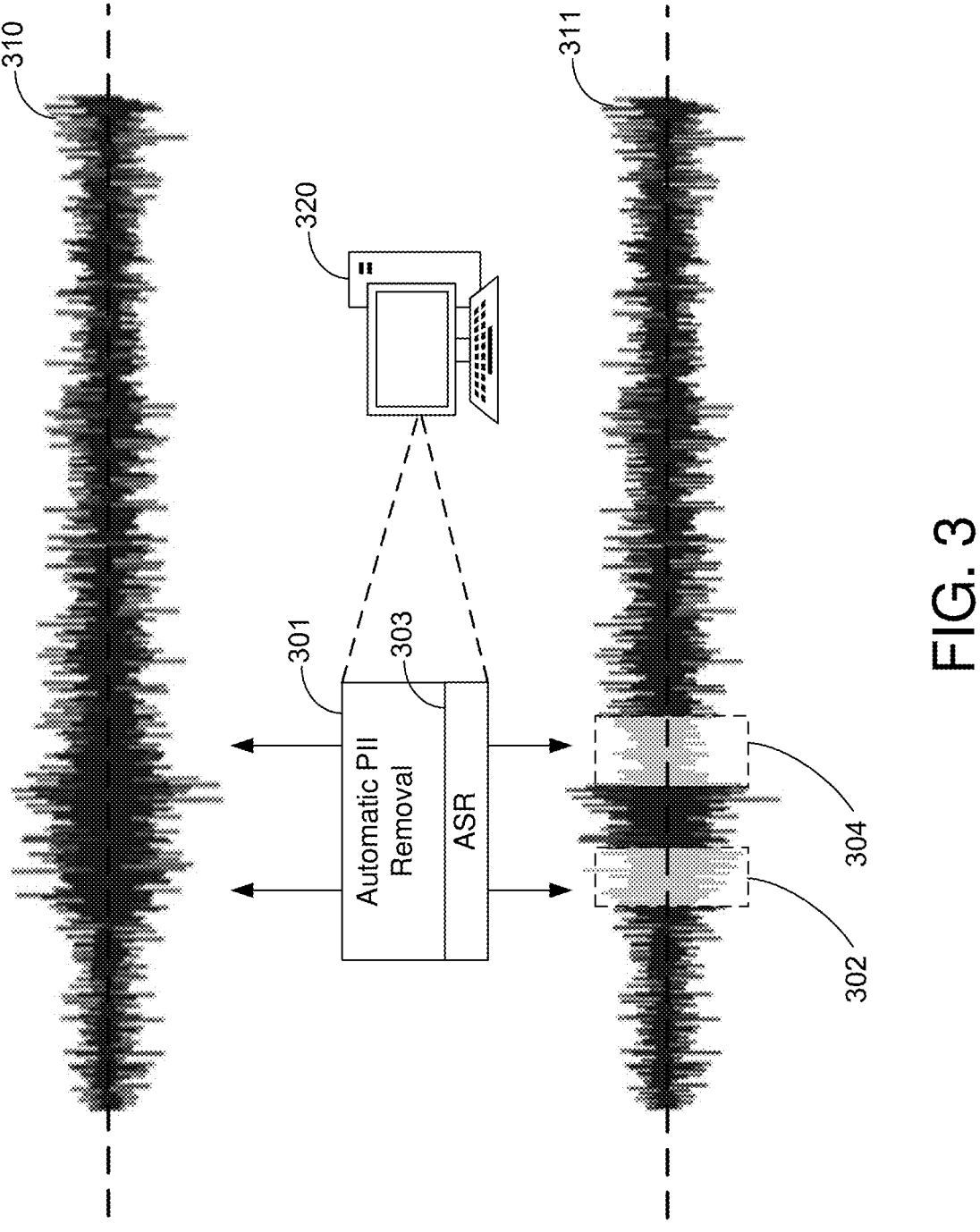

FIGS. 2 and 3 depict illustrative schematic diagrams for an automatic PII removal algorithm system, in accordance with one or more example embodiments of the present disclosure.

Referring to FIG. 2, there is shown a segment of a sound 210 that may be a combination of a plurality of sounds that may include segments of human speech in addition to sounds from a machine.

In one or more embodiments, the automatic PII removal system may utilize enhanced functions such as automatic speech recognition (ASR) 203 and an automatic PII removal 201 on a computer system 220. The ASR 203 may detect human speech and sounds using a sensor (e.g., a microphone) not necessarily attached to an industrial machine. The automatic PII removal 201 performs functions that help remove human speech from other sounds detected by the sensor (e.g., sensor 122 of FIG. 1). The automatic PII removal system may identify segments of sound (e.g., segments 202 and 204) where human speech has overlapped the machine sounds. The automatic PII removal system may determine whether to replace these segments with the constant value (e.g., a zero or other value) or can try to filter the segment but still keep the background that includes the machine sounds. In the example of FIG. 2, segments 202 and 204 are shown to be replaced by a zero value, which is equivalent to removing those portions from processing. The resulting sound signal is shown as sound signal 211 that may be sent downstream for processing.

In one or more embodiments, the automatic PII removal system may identify segments (e.g., segments 202 and 204) that are captured by a sensor (e.g., a microphone) connected to the computer system 220 and determine time indices associated with those segments in addition to the length of each segment to determine how to operate on those segments.

In one or more embodiments, the automatic PII removal system may provide end-user downstream algorithms the option of not processing those segments (e.g., segments 202 and 204) that were identified to comprise human speech.

Referring to FIG. 3, there is shown a segment of a sound 310 that may be a combination of a plurality of sounds that may include segments of human speech in addition to sounds from a machine.

In one or more embodiments, the automatic PII removal system may facilitate enhanced functions such as automatic speech recognition (ASR) 303 and an automatic PII removal 301 on a computer system 320.

In one or more embodiments, the automatic PII removal system may identify segments of sound (e.g., segments 302 and 304) where human speech has overlapped the machine sounds. The automatic PII removal system may filter the human speech from these segments of sound while still keeping the background sound that includes the machine sound. The resulting sound signal is sound signal 311 that may be sent downstream for processing. To remove the human speech from the segments, the automatic PII removal system may compare the sound 310 to a reference sound associated with a training session where the reference sound is determined during the operation of the machine without the influence of human speech. The automatic PII removal system may compare the sound 310 to the reference sound and generate the resulting sound signal 311.

It is understood that the above descriptions are for purposes of illustration and are not meant to be limiting.

Figure 4:
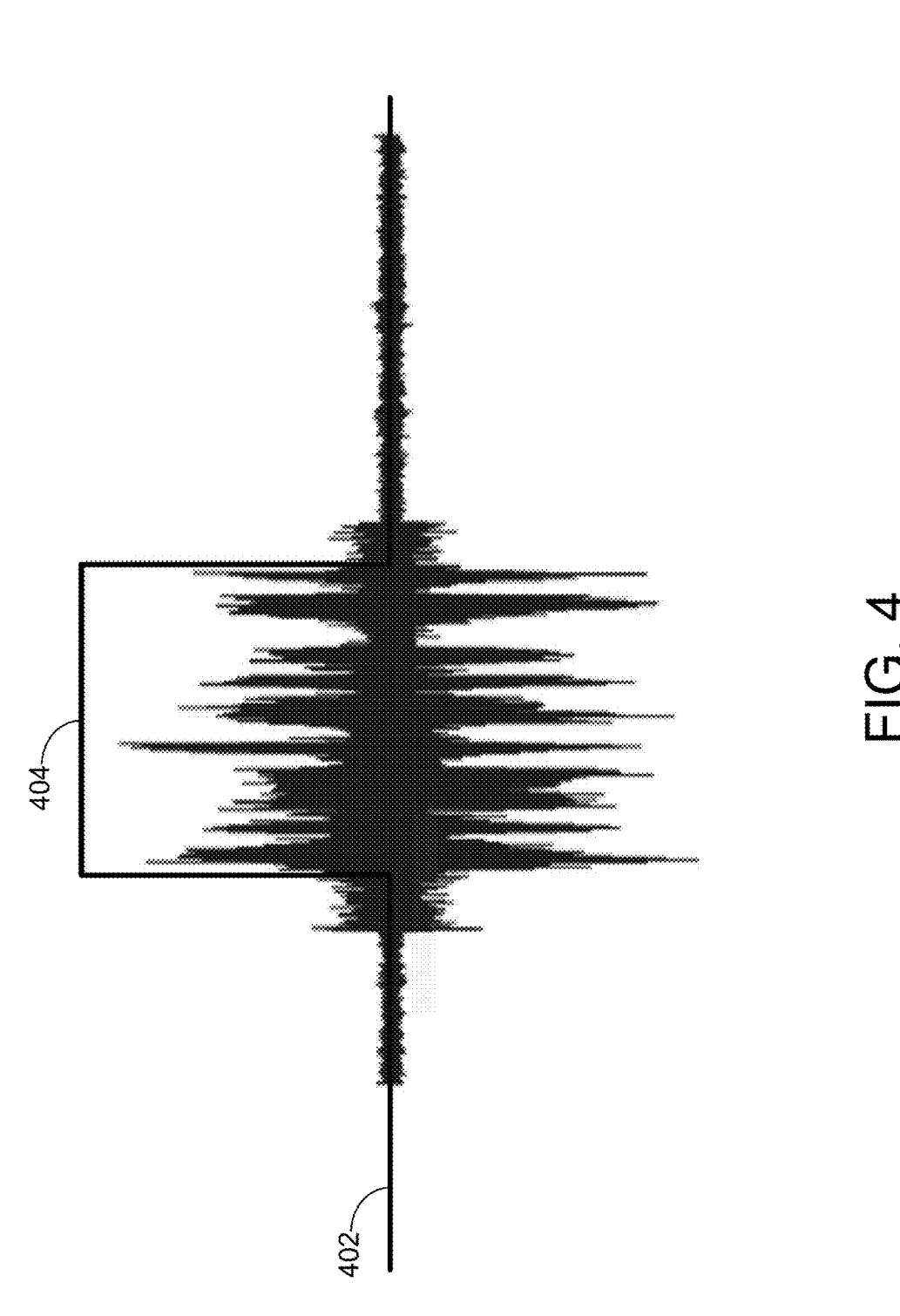
FIG. 4 depicts an illustrative schematic diagram for an output of a speech detection subsystem, in accordance with one or more example embodiments of the present disclosure.

FIG. 4 depicts an illustrative schematic diagram for an output of a speech detection subsystem, in accordance with one or more example embodiments of the present disclosure.

In FIG. 4, the automatic PII removal system may comprise a speech detection subsystem (e.g., ASR) that may monitor segments of sound captured by a sensor such as a microphone. The speech detection subsystem may indicate that during normal operation of the machine, a "0" value is read (e.g., value 402), and for segments that deviate from the normal operation of the machine (e.g., where human speech may be interlaced with the machine sounds), a "1" value may be read (e.g., value 404). This way, the speech detection subsystem may be able to flag whenever the value is equal to "1" or "0". When a change is detected from "0" to "1" (false to true), the speech detection subsystem may capture the time index. The speech detection subsystem may also be able to determine the length during which the value is equal to "1". That information indicates the time index of a segment of interest and the duration of that segment. Although the automatic PII removal system may capture and remove segments that are interlaced with a human speech, the human speech is used as an example and other sounds may also be flagged to be removed or subtracted from a reference signal of the machine. Some examples include sounds that may be coming from adjacent rooms, tool noise, alarms, forklift backing up, or other sounds that may interlace with the machine sounds.

It is understood that the above descriptions are for purposes of illustration and are not meant to be limiting.

Figure 5:
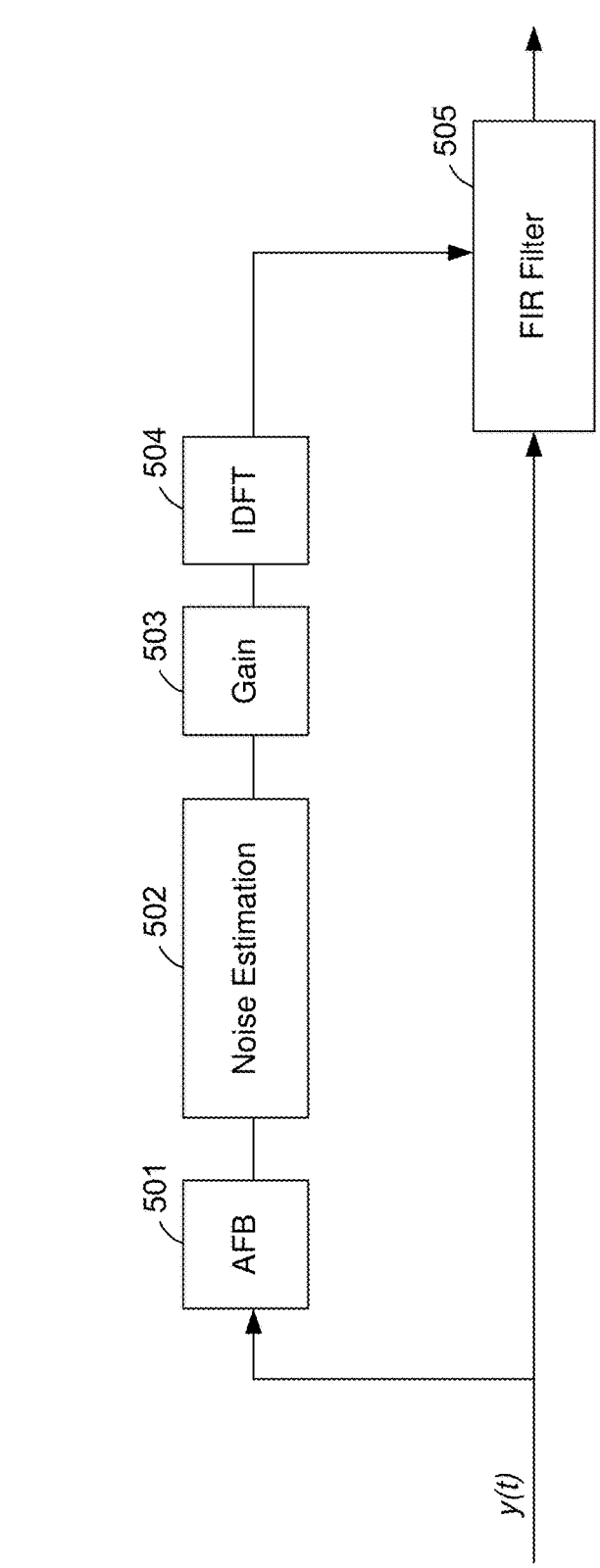
FIG. 5 depicts an illustrative schematic diagram for automatic PII removal, in accordance with one or more example embodiments of the present disclosure.

FIG. 5 depicts an illustrative schematic diagram for automatic PII removal, in accordance with one or more example embodiments of the present disclosure.

Referring to FIG. 5, there is shown a possible implementation of the speech removal algorithm, where the block descriptions are as follows:

AFB 501—Analysis Filter Bank.

Noise Estimation 502—a subsystem that estimates the noise in the frequency domain.

Gain 503—computation of the gain vector to be applied to the noisy signal. Each element of the gain vector corresponds to a frequency band. The gains are inverted to remove the speech.

IDFT 504—the inverse discrete Fourier transform, converts the gains into time-domain FIR filter coefficients.

FIR Filter 505—a finite impulse response filter used to filter the input audio y(t).

To listen to samples, please see attached sound clips included with this document.

It is understood that the above descriptions are for purposes of illustration and are not meant to be limiting.

Figure 6:
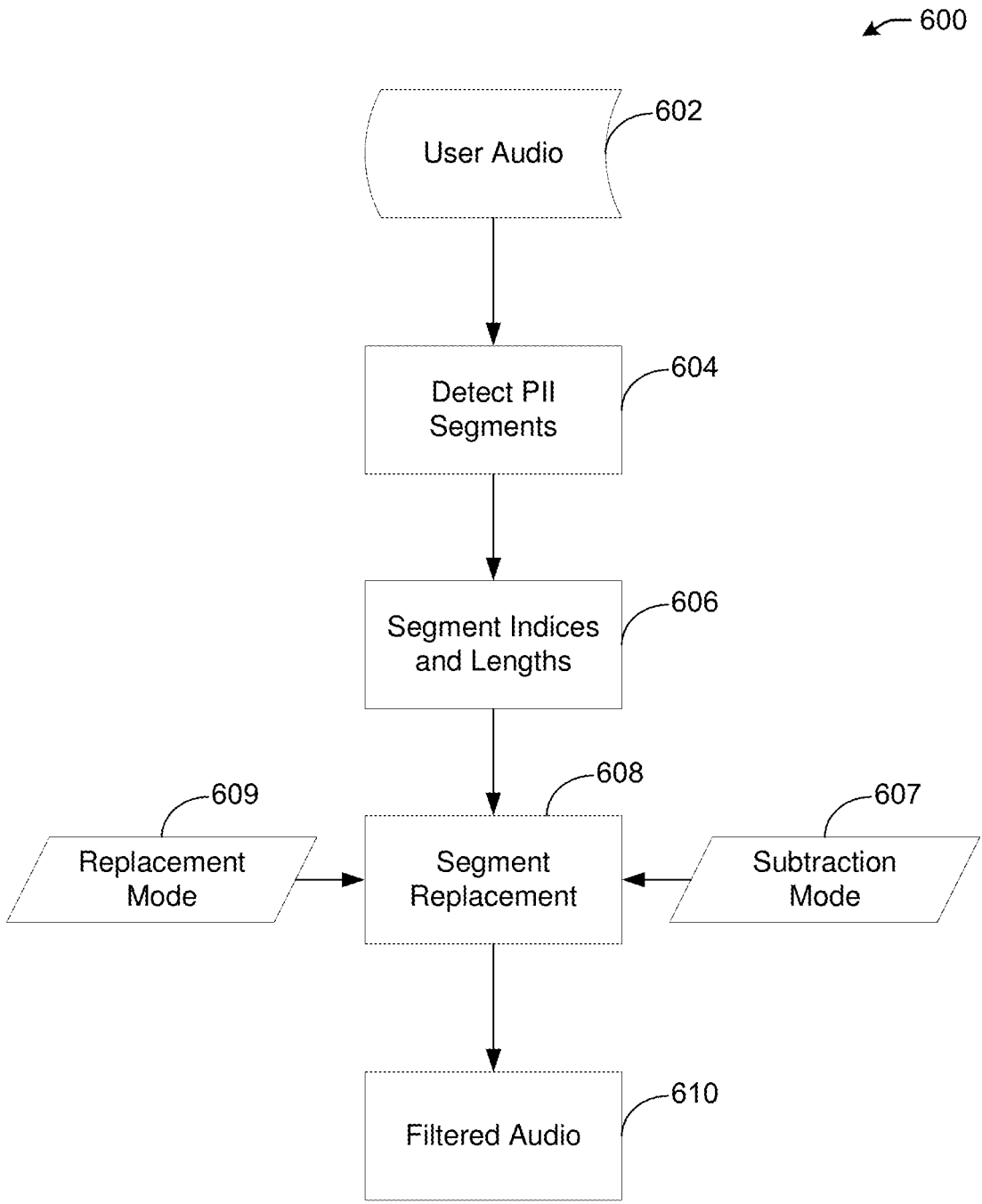
FIG. 6 illustrates a flow diagram of a process for an illustrative automatic PII removal system, in accordance with one or more example embodiments of the present disclosure.

FIG. 6 illustrates a flow diagram of a process 600 for an automatic PII removal system, in accordance with one or more example embodiments of the present disclosure.

At block 602, a device (e.g., the computer system 120 of FIG. 1 and/or the automatic PII removal device 719 of FIG. 7) may detect a sound signal received from a vicinity of a machine during operation of the machine.

At block 604, the device may perform speech detection to detect a segment of the sound signal that comprises a speech signal.

At block 606, the device may determine the segments of the sound signal and the length of these segments.

At block 608, the device may modify the sound signal at the segment of the sound signal by performing a segment replacement mode 609 or a subtraction mode 607; and At block 610, the device may generate a filtered sound signal to be used for monitoring the operation of the machine.

It is understood that the above descriptions are for purposes of illustration and are not meant to be limiting.

Figure 7:
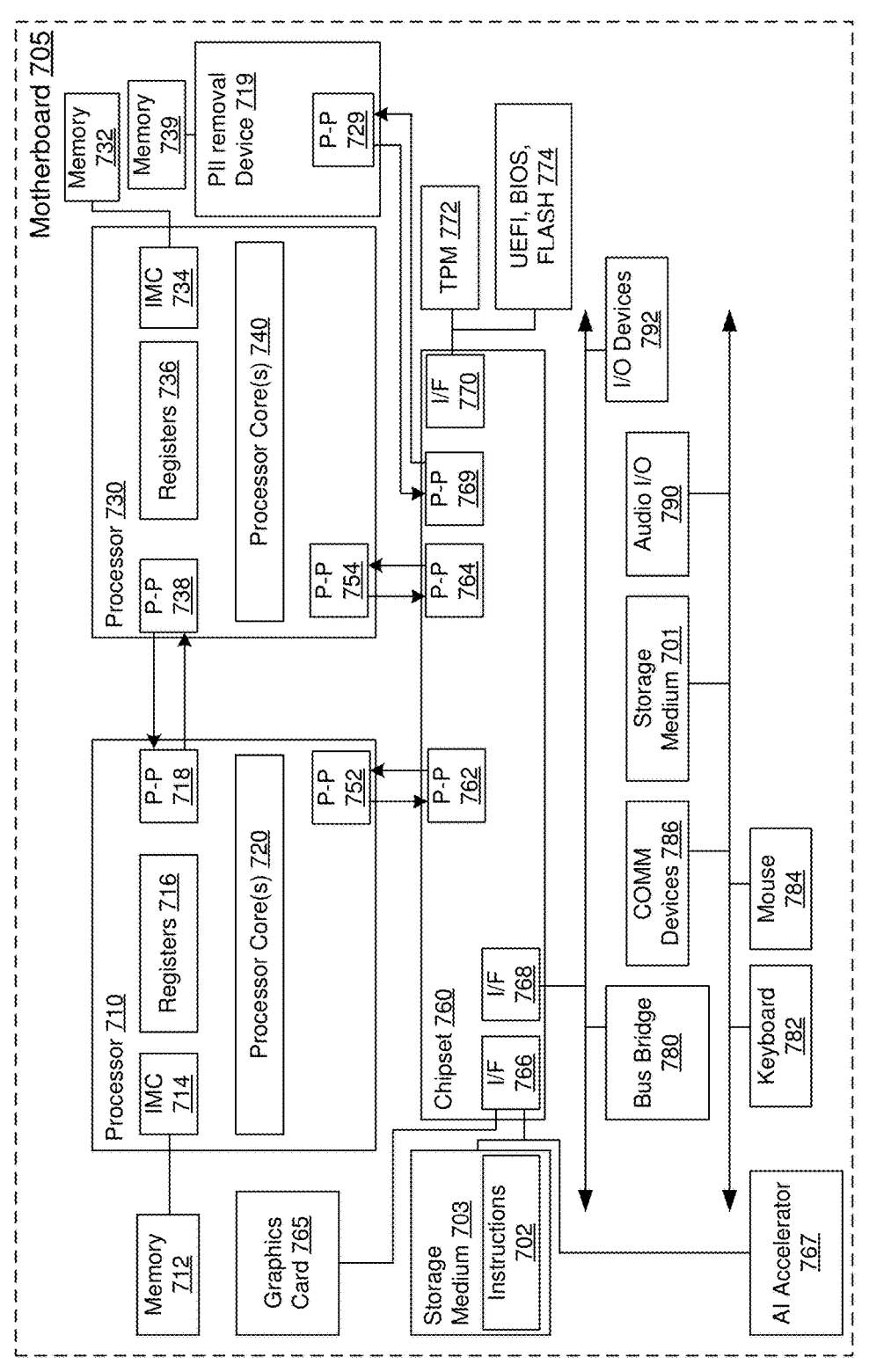
FIG. 7 illustrates a block diagram illustrating an example of a computing device or computing system upon which any of one or more techniques (e.g., methods) may be performed, in accordance with one or more example embodiments of the present disclosure.

FIG. 7 illustrates an embodiment of an exemplary computing system 700, in accordance with one or more example embodiments of the present disclosure.

In various embodiments, the computing architecture system may comprise or be implemented as part of an electronic device.

In some embodiments, the computing system 700 may be representative, for example, of a computer system that implements one or more components the figures (e.g., computer systems 120, 220, 320).

The embodiments are not limited in this context. More generally, the computing system 700 is configured to implement all logic, systems, processes, logic flows, methods, equations, apparatuses, and functionality described herein and with reference to FIGS. 1-6.

The system 700 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, hand-held device such as a personal digital assistant (PDA), or other devices for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 700 may have a single processor with one core or more than one processor. Note that the term "processor" refers to a processor with a single core or a processor package with multiple processor cores.

In at least one embodiment, the computing system 700 is representative of one or more components of FIG. 1. More generally, the computing system 700 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary computing system 700. For example, a component can be but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers.

Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 700 comprises a motherboard 705 for mounting platform components. The motherboard 705 is a point-to-point interconnect platform that includes a processor 710, a processor 730coupled via a point-to-point interconnects as an Ultra Path Interconnect (UPI), and an automatic PII removal device 719. In other embodiments, the system 700 may be of another bus architecture, such as a multi-drop bus. Furthermore, each of processors 710 and 730 may be processor packages with multiple processor cores. As an example, processors 710 and 730 are shown to include processor core(s) 720 and 740, respectively. While the system 700 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 710 and the chipset 760. Some platforms may include additional components and some platforms may only include sockets to mount the processors and/or the chipset.

The processors 710 and 7300 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 710 and 730.

The processor 710 includes an integrated memory controller (IMC) 714 and point-to-point (P-P) interfaces 718 and 752. Similarly, the processor 730 includes an IMC 734 and P-P interfaces 738 and 754. The WIC's 714 and 734 couple the processors 710 and 730, respectively, to respective memories, a memory 712 and a memory 732. The memories 712 and 732 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 712 and 732 locally attach to the respective processors 710 and 730.

In addition to the processors 710 and 730, the system 700 may include an automatic PII removal device 719. The automatic PII removal device 719 may be connected to chipset 760 by means of P-P interfaces 729 and 769. The automatic PII removal device 719 may also be connected to a memory 739. In some embodiments, the automatic PII removal device 719 may be connected to at least one of the processors 710 and 730. In other embodiments, the memories 712, 732, and 739 may couple with the processors 710 and 730, and the automatic PII removal device 719 via a bus and shared memory hub.

System 700 includes chipset 760 coupled to processors 710 and 730. Furthermore, chipset 760 can be coupled to storage medium 703, for example, via an interface (I/F) 766. The I/F 766 may be, for example, a Peripheral Component Interconnect-enhanced (PCI-e). The processors 710, 730, and the automatic PII removal device 719 may access the storage medium 703 through chipset 760.

Storage medium 703 may comprise any non-transitory computer-readable storage medium or machine-readable storage medium, such as an optical, magnetic, or semiconductor storage medium. In various embodiments, storage medium 703 may comprise an article of manufacture. In some embodiments, storage medium 703 may store computer-executable instructions, such as computer-executable instructions 702 to implement one or more of the processes or operations described herein, (e.g., process 600 of FIG. 6). The storage medium 703 may store computer-executable instructions for any equations depicted above. The storage medium 703 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 710 couples to a chipset 760 via P-P interfaces 752 and 762 and the processor 730 couples to a chipset 760 via P-P interfaces 754 and 764. Direct Media Interfaces (DMIs) may couple the P-P interfaces 752 and 762 and the P-P interfaces 754 and 764, respectively. The DMI may be a high-speed interconnect that facilitates, e.g., eight Giga Transfers per second (GT/s) such as DMI 3.0. In other embodiments, the processors 710 and 730 may interconnect via a bus.

The chipset 760 may comprise a controller hub such as a platform controller hub (PCH). The chipset 760 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 760 may comprise more than one controller hub such as a chipset with a memory controller hub, a graphics controller hub, and an input/output (I/O) controller hub.

In the present embodiment, the chipset 760 couples with a trusted platform module (TPM) 772 and the UEFI, BIOS, Flash component 774 via an interface (I/F) 770. The TPM 772 is a dedicated microcontroller designed to secure hardware by integrating cryptographic keys into devices. The UEFI, BIOS, Flash component 774 may provide pre-boot code.

Furthermore, chipset 760 includes the I/F 766 to couple chipset 760 with a high-performance graphics engine, graphics card 765. In other embodiments, the system 700 may include a flexible display interface (FDI) between the processors 710 and 730 and the chipset 760. The FDI interconnects a graphics processor core in a processor with the chipset 760.

Various I/O devices 792 couple to the bus 781, along with a bus bridge 780 which couples the bus 781 to a second bus 791 and an I/F 768 that connects the bus 781 with the chipset 760. In one embodiment, the second bus 791 may be a low pin count (LPC) bus. Various devices may couple to the second bus 791 including, for example, a keyboard 782, a mouse 784, communication devices 786, a storage medium 701, and an audio I/O 790.

The artificial intelligence (AI) accelerator 767 may be circuitry arranged to perform computations related to AI. The AI accelerator 767 may be connected to storage medium 703 and chipset 760. The AI accelerator 767 may deliver the processing power and energy efficiency needed to enable abundant data computing. The AI accelerator 767 is a class of specialized hardware accelerators or computer systems designed to accelerate artificial intelligence and machine learning applications, including artificial neural networks and machine vision. The AI accelerator 767 may be applicable to algorithms for robotics, internet of things, other data-intensive and/or sensor-driven tasks.

Many of the I/O devices 792, communication devices 786, and the storage medium 701 may reside on the motherboard 705 while the keyboard 782 and the mouse 784 may be add-on peripherals. In other embodiments, some or all the I/O devices 792, communication devices 786, and the storage medium 701 are add-on peripherals and do not reside on the motherboard 705.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The following examples pertain to further embodiments.

Example 1 may include a system that comprises at least one memory that stores computer-executable instructions; and at least one processor configured to access the at least one memory and execute the computer-executable instructions to: detect a sound signal received from a vicinity of a machine during operation of the machine; perform speech detection to detect a segment of the sound signal that comprises a speech signal; modify the sound signal at the segment of the sound signal by performing a segment replacement mechanism; and generate a filtered sound signal to be used for monitoring the operation of the machine.

Example 2 may include the system of example 1 and/or some other example herein, wherein performing speech detection returns personal identifiable information (PII) associated with the segment of the sound signal.

Example 3 may include the system of example 1 and/or some other example herein, wherein performing speech detection returns a time index and a length associated with the segment of the sound signal.

Example 4 may include the system of example 1 and/or some other example herein, wherein the speech detection algorithm may be an automatic speech recognition (ASR).

Example 5 may include the system of example 1 and/or some other example herein, further comprising computer-executable instructions to employ a replacement mode or a subtraction mode to modify the sound signal at the segment of the sound signal.

Example 6 may include the system of example 5 and/or some other example herein, wherein the replacement mode replaces the segment of sound signal with a predetermined signal value.

Example 7 may include the system of example 5 and/or some other example herein, wherein the subtraction mode filters out speech from the segment of the sound signal using a reference signal.

Example 8 may include the system of example 7 and/or some other example herein, wherein the reference signal may be determined using a training mode of the machine during operation without speech.

Example 9 may include a non-transitory computer-readable medium storing computer-executable instructions which when executed by one or more processors result in performing operations comprising: detecting a sound signal received from a vicinity of a machine during operation of the machine; performing speech detection to detect a segment of the sound signal that comprises a speech signal; modifying the sound signal at the segment of the sound signal by performing a segment replacement mechanism; and generating a filtered sound signal to be used for monitoring the operation of the machine.

Example 10 may include the non-transitory computer-readable medium of example 9 and/or some other example herein, wherein performing speech detection returns personal identifiable information (PII) associated with the segment of the sound signal.

Example 11 may include the non-transitory computer-readable medium of example 9 and/or some other example herein, wherein performing speech detection returns a time index and a length associated with the segment of the sound signal.

Example 12 may include the non-transitory computer-readable medium of example 9 and/or some other example herein, wherein the speech detection algorithm may be an automatic speech recognition (ASR).

Example 13 may include the non-transitory computer-readable medium of example 9 and/or some other example herein, wherein the operations further comprise employ a replacement mode or a subtraction mode to modify the sound signal at the segment of the sound signal.

Example 14 may include the non-transitory computer-readable medium of example 13 and/or some other example herein, wherein the replacement mode replaces the segment of sound signal with a predetermined signal value.

Example 15 may include the non-transitory computer-readable medium of example 13 and/or some other example herein, wherein the subtraction mode filters out speech from the segment of the sound signal using a reference signal.

Example 16 may include the non-transitory computer-readable medium of example 7 and/or some other example herein, wherein the reference signal may be determined using a training mode of the machine during operation without speech.

Example 17 may include a method comprising: detecting, by one or more processors, a sound signal received from a vicinity of a machine during operation of the machine; performing speech detection to detect a segment of the sound signal that comprises a speech signal; modifying the sound signal at the segment of the sound signal by performing a segment replacement mechanism; and generating a filtered sound signal to be used for monitoring the operation of the machine.

Example 18 may include the method of example 17 and/or some other example herein, wherein performing speech detection returns personal identifiable information (PII) associated with the segment of the sound signal.

Example 19 may include the method of example 17 and/or some other example herein, wherein performing speech detection returns a time index and a length associated with the segment of the sound signal.

Example 20 may include the method of example 17 and/or some other example herein, wherein the speech detection algorithm may be an automatic speech recognition (ASR).

Example 21 may include the method of example 17 and/or some other example herein, further comprising employ a replacement mode or a subtraction mode to modify the sound signal at the segment of the sound signal.

Example 22 may include the method of example 21 and/or some other example herein, wherein the replacement mode replaces the segment of sound signal with a predetermined signal value.

Example 23 may include the method of example 21 and/or some other example herein, wherein the subtraction mode filters out speech from the segment of the sound signal using a reference signal.

Example 24 may include the method of example 23 and/or some other example herein, wherein the reference signal may be determined using a training mode of the machine during operation without speech.

Example 25 may include an apparatus comprising means for: detecting a sound signal received from a vicinity of a machine during operation of the machine; performing speech detection to detect a segment of the sound signal that comprises a speech signal; modifying the sound signal at the segment of the sound signal by performing a segment replacement mechanism; and generating a filtered sound signal to be used for monitoring the operation of the machine.

Example 26 may include the apparatus of example 25 and/or some other example herein, wherein performing speech detection returns personal identifiable information (PII) associated with the segment of the sound signal.

Example 27 may include the apparatus of example 25 and/or some other example herein, wherein performing speech detection returns a time index and a length associated with the segment of the sound signal.

Example 28 may include the apparatus of example 25 and/or some other example herein, wherein the speech detection algorithm may be an automatic speech recognition (ASR).

Example 29 may include the apparatus of example 25 and/or some other example herein, further comprising employ a replacement mode or a subtraction mode to modify the sound signal at the segment of the sound signal.

Example 30 may include the apparatus of example 29 and/or some other example herein, wherein the replacement mode replaces the segment of sound signal with a predetermined signal value.

Example 31 may include the apparatus of example 29 and/or some other example herein, wherein the subtraction mode filters out speech from the segment of the sound signal using a reference signal.

Example 32 may include the apparatus of example 31 and/or some other example herein, wherein the reference signal may be determined using a training mode of the machine during operation without speech.

Example 33 may include one or more non-transitory computer-readable media comprising instructions to cause an electronic device, upon execution of the instructions by one or more processors of the electronic device, to perform one or more elements of a method described in or related to any of examples 1-32, or any other method or process described herein.

Example 34 may include an apparatus comprising logic, modules, and/or circuitry to perform one or more elements of a method described in or related to any of examples 1-32, or any other method or process described herein.

Example 35 may include a method, technique, or process as described in or related to any of examples 1-32, or portions or parts thereof.

Example 36 may include an apparatus comprising: one or more processors and one or more computer-readable media comprising instructions that, when executed by the one or more processors, cause the one or more processors to perform the method, techniques, or process as described in or related to any of examples 1-14, or portions thereof.

Example 37 may include a method of communicating in a wireless network as shown and described herein.

Example 38 may include a system for providing wireless communication as shown and described herein.

Example 39 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising: at least one memory that stores computer-executable instructions; and at least one processor configured to access the at least one memory and execute the computer-executable instructions to:

detect a sound signal received from a vicinity of a machine during operation of the machine;

perform speech detection to detect a segment of the sound signal that comprises a speech signal;

modify the sound signal at the segment of the sound signal by performing a segment replacement mechanism, including filtering out the speech signal from the segment of the sound signal using a reference signal; and generate a filtered sound signal to be used for monitoring the operation of the machine, wherein monitoring the operation of the machine includes monitoring the sound signal and the filtered sound signal for indications the machine is operating atypically.

2. The system of claim 1, wherein performing speech detection returns personal identifiable information (PII) associated with the segment of the sound signal.

3. The system of claim 1, wherein performing speech detection returns a time index and a length associated with the segment of the sound signal.

4. The system of claim 1, wherein the speech detection is an automatic speech recognition (ASR).

5. The system of claim 1, further comprising computer-executable instructions to employ a replacement mode or a subtraction mode to modify the sound signal at the segment of the sound signal.

6. The system of claim 5, wherein the replacement mode replaces the segment of the sound signal with a predetermined signal value.

7. The system of claim 5, wherein the reference signal is determined using a training mode of the machine during operation without speech.

8. The system of claim 1, wherein filtering out the speech signal from the segment of the sound signal includes applying a filter to remove frequences associated with speech.

9. The system of claim 8, wherein filtering out the speech signal from the segment of the sound signal includes applying the filter to remove frequences associated with speech without performing speech recognition.

10. A non-transitory computer-readable medium storing computer-executable instructions which when executed by one or more processors result in performing operations comprising:

detecting a sound signal received from a vicinity of a machine during operation of the machine;

performing speech detection to detect a segment of the sound signal that comprises a speech signal;

modifying the sound signal at the segment of the sound signal by performing a segment replacement mechanism, including filtering out the speech signal from the segment of the sound signal using a reference signal; and generating a filtered sound signal to be used for monitoring the operation of the machine.

11. The non-transitory computer-readable medium of claim 10, wherein performing speech detection returns personal identifiable information (PII) associated with the segment of the sound signal.

12. The non-transitory computer-readable medium of claim 10, wherein performing speech detection returns a time index and a length associated with the segment of the sound signal.

13. The non-transitory computer-readable medium of claim 10, wherein the speech detection is an automatic speech recognition (ASR).

14. The non-transitory computer-readable medium of claim 10, wherein the operations further comprise employ a replacement mode or a subtraction mode to modify the sound signal at the segment of the sound signal.

15. The non-transitory computer-readable medium of claim 14, wherein the replacement mode replaces the segment of the sound signal with a predetermined signal value.

16. The non-transitory computer-readable medium of claim 14, wherein the reference signal is determined using a training mode of the machine during operation without speech.

17. A method comprising:

detecting, by one or more processors, a sound signal received from a vicinity of a machine during operation of the machine;

performing speech detection to detect a segment of the sound signal that comprises a speech signal;

modifying the sound signal at the segment of the sound signal by performing a segment replacement mechanism, including filtering out the speech signal from the segment of the sound signal using a reference signal; and generating a filtered sound signal to be used for monitoring the operation of the machine.

18. The method of claim 17, wherein performing speech detection returns personal identifiable information (PII) associated with the segment of the sound signal.

19. The method of claim 17, wherein performing speech detection returns a time index and a length associated with the segment of the sound signal.

20. The method of claim 17, wherein the speech detection is an automatic speech recognition (ASR).

* * * * *